(12) United States Patent
Hebert et al.

(10) Patent No.: US 12,379,723 B1
(45) Date of Patent: Aug. 5, 2025

(54) AUTONOMOUS MOBILE ROBOT USING MULTIPLE SAFETY PROTOCOLS

(71) Applicant: Amazon Technologies, Inc., Seattle, WA (US)

(72) Inventors: Gabriel Hebert, Wakefield, MA (US); Paul Tomashevskyi, Wayland, MA (US); Adam Robert Lehmann, Glendale, AZ (US); Justin Croyle, Kalispell, MT (US); Adam Joseph Greenbaum, Boston, MA (US); Christopher John Schuchmann, Rockledge, FL (US); Erik Edward Steltz, Melrose, MA (US); Renen Bassik, Lexington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 242 days.

(21) Appl. No.: 17/822,996

(22) Filed: Aug. 29, 2022

(51) Int. Cl.
    *G05D 1/00*         (2024.01)
(52) U.S. Cl.
    CPC ......... *G05D 1/0077* (2013.01); *G05D 1/0214* (2013.01); *G05D 1/0234* (2013.01); *G05D 1/0272* (2013.01)
(58) Field of Classification Search
    CPC .. G05D 1/0077; G05D 1/0214; G05D 1/0234; G05D 1/0272
    See application file for complete search history.

(56) References Cited

U.S. PATENT DOCUMENTS

| | | | |
|---|---|---|---|
| 2015/0050922 A1* | 2/2015 | Ramalingam | H04W 4/50 455/418 |
| 2015/0112483 A1* | 4/2015 | Mougin | B25J 9/1676 901/9 |
| 2020/0017083 A1* | 1/2020 | Casselgren | B60T 8/172 |
| 2021/0156951 A1* | 5/2021 | Brunner | G01S 17/894 |
| 2021/0245704 A1* | 8/2021 | Ricke | B60W 40/12 |
| 2021/0309261 A1* | 10/2021 | Rosales | B60W 60/001 |
| 2021/0354739 A1* | 11/2021 | Hydro | A63G 21/04 |
| 2022/0185298 A1* | 6/2022 | Chen | B60W 30/09 |
| 2022/0189274 A1* | 6/2022 | Hammes | G08B 21/02 |
| 2022/0204016 A1* | 6/2022 | Lerner | B60W 60/0059 |

(Continued)

FOREIGN PATENT DOCUMENTS

CN      110395521 A    *   11/2019

OTHER PUBLICATIONS

English Translation CN110395521A (Year: 2024).*

*Primary Examiner* — Rami Khatib
(74) *Attorney, Agent, or Firm* — Eversheds Sutherland (US) LLP

(57) ABSTRACT

A method includes operating an autonomous mobile robot (AMR) in a first physical location according to a first safety protocol of the AMR and based on a location of the AMR relative to a second physical location different from the first physical location and with a second safety protocol different from the first safety protocol, switching the AMR to operate under the second safety protocol rather than the first safety protocol while the AMR is located in the second physical location. The method also includes, in response to detecting that the AMR is exiting the second physical location after the AMR has completed operating in the second physical location, switching the AMR to operate under the first safety protocol.

18 Claims, 10 Drawing Sheets

(56) References Cited

U.S. PATENT DOCUMENTS

| | | | | |
|---|---|---|---|---|
| 2023/0106617 A1* | 4/2023 | Ouellette | ............ | G05D 1/0246 |
| | | | | 700/245 |
| 2023/0311701 A1* | 10/2023 | Wang | ...................... | B60L 53/80 |
| | | | | 320/109 |
| 2023/0315130 A1* | 10/2023 | Komuro | ................. | G05D 1/243 |
| | | | | 701/28 |
| 2024/0012413 A1* | 1/2024 | Ams | .................... | G05D 1/0274 |
| 2024/0040535 A1* | 2/2024 | Loy | ........................ | G01S 1/026 |

\* cited by examiner

AUTONOMOUS MOBILE ROBOT USING MULTIPLE SAFETY PROTOCOLS

BACKGROUND

The present invention relates to robotics, and more specifically, to operating autonomous mobile robots (AMRs).

DETAILED DESCRIPTION

Autonomous mobile robots (AMRs) may be used to move objects in various settings. For example, AMRs may be used to lift and move heavy containers in a warehouse or factory. An AMR may lift the container and then transport the container to another section of the warehouse or factory. The AMR may operate according to a safety protocol programmed for the AMR so that the AMR does not hit or contact other objects or people while lifting and moving the container. Some warehouses or factories, however, may include spaces that are smaller or more confined than other spaces in the warehouse or factory. As a result, the programmed safety protocol of the AMR may not ensure that the AMR operates safely when the AMR is located in these smaller or more confined spaces.

The present disclosure describes a process for operating an AMR in smaller or more confined spaces, which may be governed by different safety protocols than the programmed safety protocol of the AMR. Generally, the AMR may operate according to its programmed safety protocol, but when the AMR detects that the AMR is about to enter one of these spaces, the AMR may connect to a safety controller for that space. The AMR may then switch from operating under its programmed safety protocol to operating under the safety protocol provided by the safety controller. In this manner, the AMR operates under the proper safety protocol while the AMR is located in the smaller or more confined space. When the AMR has completed its operation in the space and is ready to leave the space, the AMR disconnects from the safety controller and switches back to operating according to the programmed safety protocol of the AMR. As a result, the AMR operates safely even when the AMR is located in the smaller or more confined space, in certain embodiments.

Figure 1:
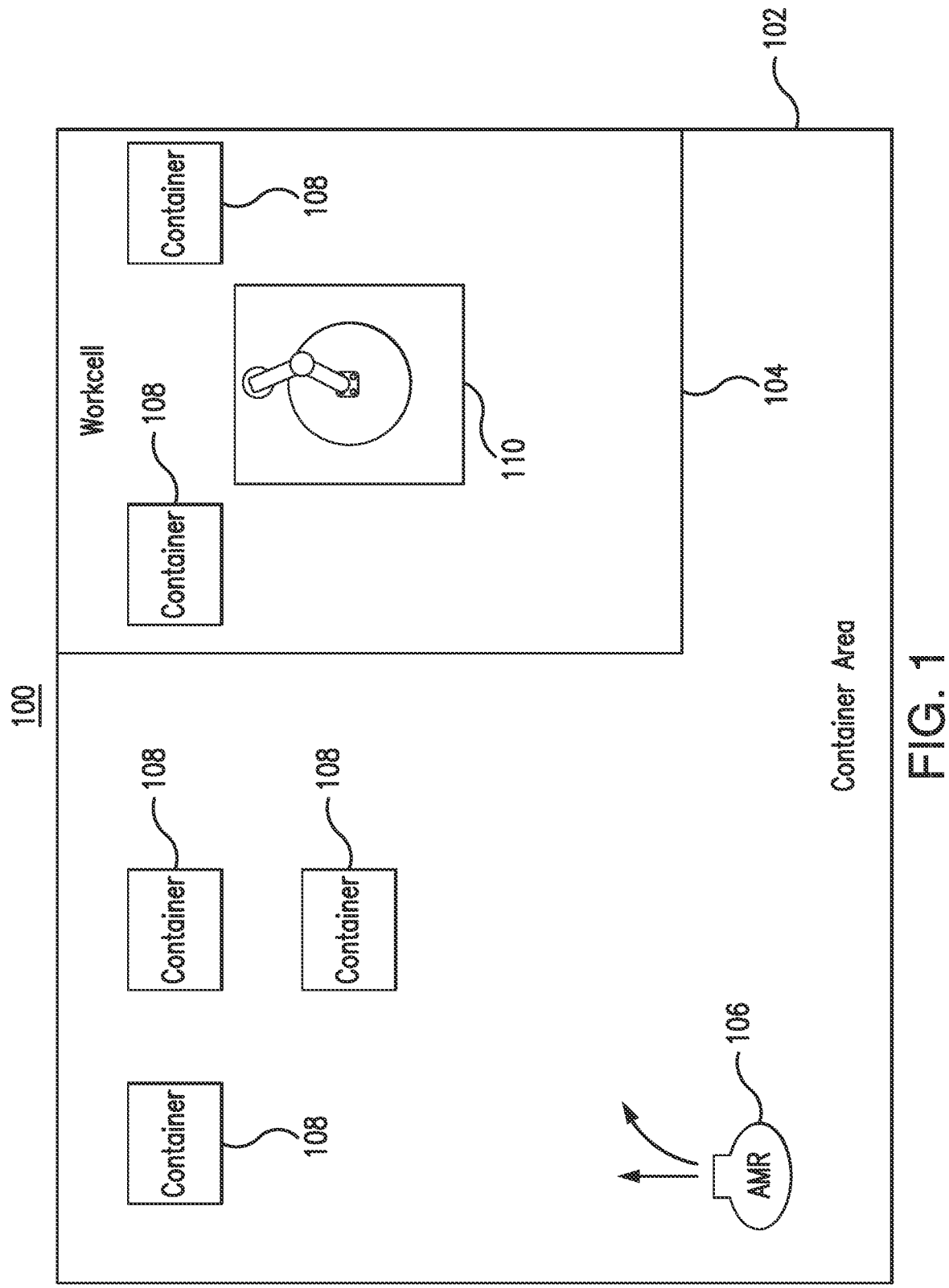
FIG. 1 illustrates an example system.

FIG. 1 illustrates an example system 100. The system 100 may be a facility such as a factory or warehouse. Various robots may operate within the system 100 to move or transport other objects within the system 100. As seen in FIG. 1, the system 100 is divided into a container area 102 and a workcell 104. The system 100 also includes an AMR 106, one or more containers 108, and a robotic arm 110. In certain embodiments, the AMR 106 operates under different safety protocols depending on which area of the system 100 the AMR 106 is located. In this manner, the AMR 106 safely operates in the system 100 even though different areas of the system 100 are governed by different safety protocols, in certain embodiments.

The system 100 is divided into any suitable number of areas with any suitable number of purposes. Different areas of the system 100 may be governed by different safety protocols. In the example of FIG. 1, the system 100 is divided into a container area 102 and a workcell 104. The container area 102 holds or stores multiple containers 108. The container area 102 may be larger and more open compared to the workcell 104. The AMR 106 may operate within the container area 102 according to a default, programmed safety protocol of the AMR 106.

The workcell 104 includes the robotic arm 110 that operates to move the containers 108 in the workcell 104 or objects within the containers 108 in the workcell 104. The workcell 104 may be smaller and more confined compared to the container area 102. The robotic arm 110 may rotate, swing, or move to grab the containers 108 or objects within the containers 108. Due to the confined nature of the workcell 104 and the movement of the robotic arm 110, the workcell 104 may be governed by a different safety protocol than the container area 102. The robotic arm 110 may operate according to the safety protocol that governs the workcell 104.

The AMR 106 moves or transports containers 108 throughout the system 100. The AMR 106 may include components that lift a container 108 so that the AMR 106 may move the lifted container 108 to other parts of the system 100. The AMR 106 may include a programmed safety protocol that allows the AMR 106 to move within the system 100 without hitting or contacting other objects or people in the system 100. For example, the programmed safety protocol of the AMR 106 may allow the AMR 106 to operate within the container area 102 without hitting or contacting other objects or people in the container area 102. This programmed safety protocol of the AMR 106, however, may not ensure that the AMR 106 operates safely within the workcell 104, which may be a smaller and more confined area compared to the container area 102. Thus, if the AMR 106 operates using its programmed safety protocol when the AMR 106 is located in the workcell 104, then the AMR 106 may contact or hit other objects or people in the workcell 104. For example, the AMR 106 may contact other containers 108, the robotic arm 110, or a person within the workcell 104.

To help the AMR 106 operate safely when the AMR 106 is within the workcell 104, the AMR 106 may switch to operating under the safety protocol that governs the workcell 104 when the AMR 106 is moving into the workcell 104. When the AMR 106 has completed its operation in the workcell 104 and is leaving the workcell 104, the AMR 106 may switch back to its programmed safety protocol. In this manner, the AMR 106 operates under the applicable safety protocol of the area of the system 100 in which the AMR 106 is located. As a result, the AMR 106 operates safely no matter which area of the system 100 the AMR 106 is located, in certain embodiments.

The AMR 106 may switch between the safety protocols in any suitable manner. For example, the AMR 106 may directly switch from the programmed safety protocol of the AMR 106 to the safety protocol that governs the workcell 104. As another example, there may be an intermediate state where the AMR 106 operates under both the programmed safety protocol of the AMR 106 and the safety protocol that governs the workcell 104. The AMR 106 may first transition to this intermediate state and then transition to operating under another safety protocol (e.g., the programmed safety protocol of the AMR 106 or the safety protocol governing the workcell 104).

Figure 2:
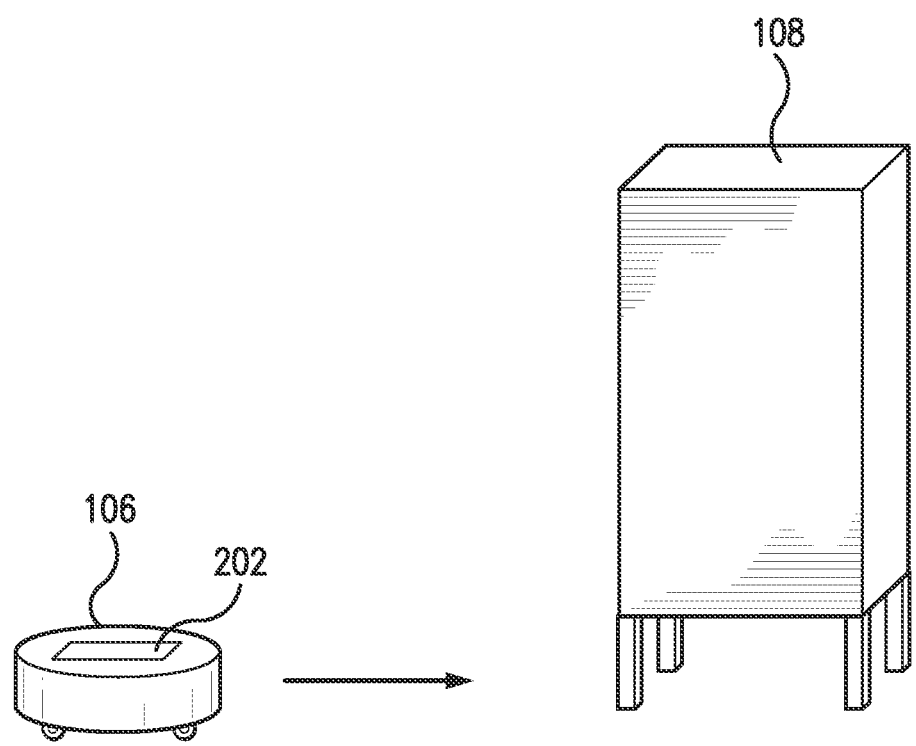
FIG. 2 illustrates an example AMR in the system of FIG. 1.

FIG. 2 illustrates an example AMR 106 in the system 100 of FIG. 1. Specifically, FIG. 2 illustrates the operation of the AMR 106 with respect to a container 108. Generally, the AMR 106 may move underneath the container 108 and then lift the container 108 to move or transport the container 108. In the example of FIG. 2, the AMR 106 includes a platform 202. When the AMR 106 moves underneath the container 108, the AMR 106 may raise the platform 202 to lift the container 108. After the container 108 is lifted, the AMR 106 may move to move or transport the container 108.

The AMR 106 may include any suitable mechanism for lifting or grabbing the container 108 so that the AMR 106 may move or transport the container 108. For example, the AMR 106 may include an arm or a grabber that grabs or lifts the container 108. As another example, the AMR 106 may include a ramp that lifts the container 108.

Figure 3:
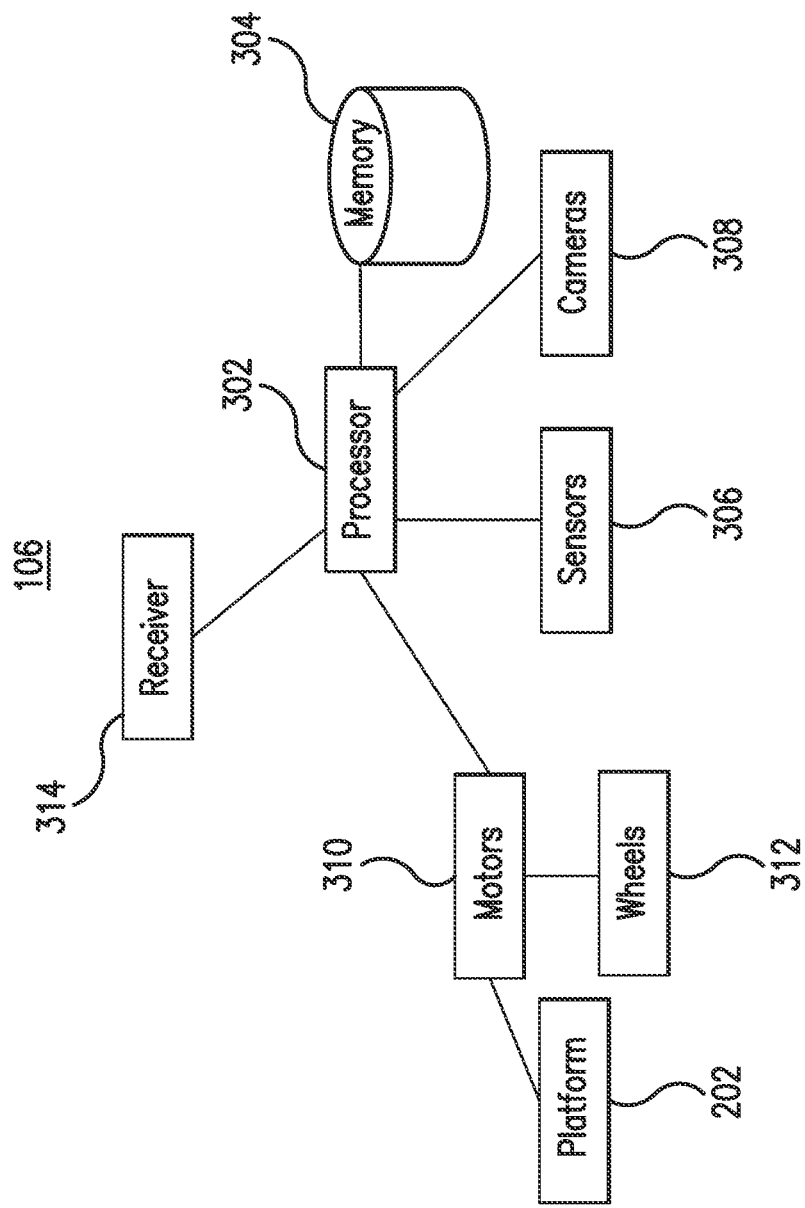
FIG. 3 illustrates an example AMR in the system of FIG. 1.

FIG. 3 illustrates an example AMR 106 in the system 100 of FIG. 1. As seen in FIG. 3, the AMR 106 includes a processor 302, a memory 304, one or more sensors 306, one or more cameras 308, one or more motors 310, one or more wheels 312, a receiver 314, and the platform 202. The components of the AMR 106 operate together to move and transport the containers 108 in the system 100.

The processor 302 and the memory 304 control the operation of the AMR 106. For example, the processor 302 may evaluate information from the sensors 306 and the cameras 308. The processor 302 may then navigate the AMR 106 so that the AMR 106 does not hit or contact objects or people detected by the sensors 306 or cameras 308. The processor 302 may also detect when the AMR 106 is entering another area of the system 100 and determine whether the AMR 106 should operate under a different safety protocol.

The processor 302 is any electronic circuitry, including, but not limited to one or a combination of microprocessors, microcontrollers, application specific integrated circuits (ASIC), application specific instruction set processor (ASIP), and/or state machines, that communicatively couples to memory 304 and controls the operation of the AMR 106. The processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 302 may include other hardware that operates software to control and process information. The processor 302 executes software stored on the memory 304 to perform any of the functions described herein. The processor 302 controls the operation and administration of the AMR 106 by processing information (e.g., information received from the sensors 306, cameras 308, and memory 304). The processor 302 is not limited to a single processing device and may encompass multiple processing devices.

The memory 304 may store, either permanently or temporarily, data, operational software, or other information for the processor 302. The memory 304 may include any one or a combination of volatile or non-volatile local or remote devices suitable for storing information. For example, the memory 304 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 304, a disk, a CD, or a flash drive. In particular embodiments, the software may include an application executable by the processor 302 to perform one or more of the functions described herein.

The AMR 106 may include any suitable number of sensors 306 that detect various things within the environment around the AMR 106. For example, the AMR 106 may include one or more color sensors that can detect the color of objects around the AMR 106. As another example, the AMR 106 may include one or more light detection and ranging (lidar) sensors that can detect objects near the AMR 106. As yet another example, the AMR 106 may include one or more optical sensors that can detect optical signals (e.g., light) within the environment around the AMR 106. The AMR 106 may also include a barcode sensor or scanner that can detect and read barcodes in the environment around the AMR 106. Each of these sensors 306 may communicate signals to the processor 302 to indicate detections made by the sensors 306. The processor 302 may process the signals from the sensors 306 to determine how to operate the AMR 106.

The AMR 106 may include one or more cameras 308 that capture images or video of the environment around the AMR 106. The cameras 308 may communicate the captured images or videos to the processor 302. The processor 302 may use the captured images or videos to detect objects or people in the environment around the AMR 106. The processor 302 may also use the images or video to detect containers around the AMR 106.

The AMR 106 includes one or more motors 310 that mechanically operate the wheels 312 or the platform 202 of the AMR 106. The motors 310 may receive signals from the processor 302 that instruct the motors 310 to operate or to stop operation. For example, the processor 302 may communicate signals to the motors 310 so that the motors 310 turn one or more of the wheels 312. In this manner, the processor 302 controls the movement or navigation of the AMR 106. As another example, the processor 302 may communicate signals to a motor 310 to operate the platform 202. The motor 310 may cause the platform 202 to lift or to retract downwards.

The receiver 314 may be a wireless receiver that may form connections with other components of the system 100. For example, the AMR 106 may use the receiver 314 to connect with a safety controller of the workcell 104 or other network equipment in the system 100 (e.g., a router). The AMR 106 may receive messages over these connections using the receiver 314. In some embodiments, the AMR 106 may receive safety messages from a safety controller of the workcell 104 using the receiver 314, which may indicate to the AMR 106 that it is safe to operate in the workcell 104. The receiver 314 may include any suitable number of radios or antennas that allow the AMR 106 to form wireless connections. In some embodiments, the AMR 106 includes a transceiver that can wirelessly transmit messages in addition to wirelessly receiving messages.

Figure 4:
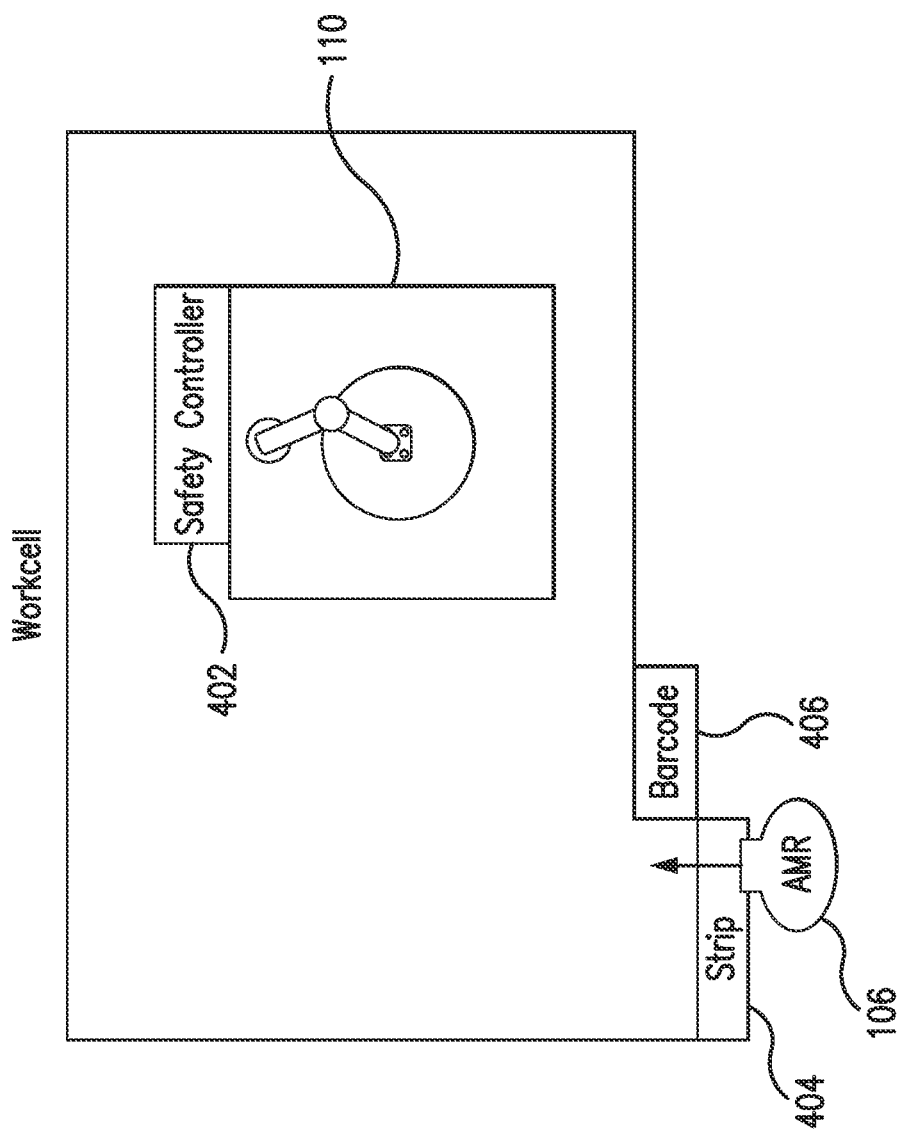
FIG. 4 illustrates an example workcell in the system of FIG. 1.

FIG. 4 illustrates an example workcell 104 in the system 100 of FIG. 1. As seen in FIG. 4, the workcell 104 includes the robotic arm 110, a safety controller 402, a strip 404, and a barcode 406. As discussed previously, the workcell 104 may be a smaller or more confined space relative to other areas in the system 100. Generally, the workcell 104 may represent any area in the system 100 that is governed by a different safety protocol than other areas of the system 100. When the AMR 106 enters the workcell 104, the AMR 106 may switch its operation to be governed by the safety protocol that governs the workcell 104. In this manner, the AMR 106 operates safely within the workcell 104, in certain embodiments.

In some embodiments, the safety controller 402 includes a processor and a memory that are configured to perform the operations of the safety controller 402 described herein. The safety controller 402 may control the operation of robots within the workcell 104. For example, the safety controller 402 may communicate instructions to robots within the workcell 104 to operate these robots according to a safety protocol governing the workcell 104. In some embodiments, the safety controller 402 may communicate the safety protocol to robots within the workcell 104 so that the robots may operate according to the safety protocol. In some embodiments, the safety controller 402 may communicate messages to robots within the workcell 104 as long as it is safe for the robots to operate. When a safety condition for the workcell 104 has been violated, the safety controller 402 may stop communicating those messages to the robots, which may cause the robots to cease operation. For example, when a person enters the workcell 104, the safety controller 402 may determine the presence of the person, and cease communicating messages to the robots within the workcell 104. When the robots in the workcell 104 determine that the messages from the safety controller 402 have stopped, the robots may stop operating, which may ensure the safety of the person in the workcell 104, in certain embodiments.

The strip 404 may mark the entrance to the workcell 104. The strip 404 may be a colored strip that is positioned on the ground at the entrance to the workcell 104. When the AMR 106 travels near or over the strip 404, a color sensor of the AMR 106 may detect the strip 404. For example, the strip 404 may be a purple strip placed on the ground at the entrance of the workcell 104. The AMR 106 may have a color sensor that is directed towards the floor. When the AMR 106 moves near or onto the strip 404, the color sensor may detect the color purple. The AMR 106 may determine that the color purple indicates that the AMR 106 is about to enter the workcell 104. The AMR 106 may then perform an operation to switch the AMR 106 from operating under its programmed safety protocol to the safety protocol governing the workcell 104. As a result, the strip 404 provides an indication to the AMR 106 that the AMR 106 is about to enter the workcell 104, and that the AMR 106 should operate under the safety protocol governing the workcell 104.

In some embodiments, instead of using a strip 404 to indicate to the AMR 106 that the AMR 106 is about to enter the workcell 104, a radio frequency identifier (RFID) tag or a physical bump may be positioned at the entrance of the workcell 104. For example, the AMR 106 may include a radio frequency sensor that can detect the RFID tag. As another example, the AMR 106 may include accelerometers or other sensors that can detect when the AMR 106 has contacted the bump. When the AMR 106 detects the RFID tag or detects the bump, the AMR 106 may determine that the AMR 106 is about to enter the workcell 104.

When the AMR 106 determines that the AMR 106 is about to enter the workcell 104, the AMR 106 may switch its operation to be governed by the safety protocol that governs the workcell 104. The AMR 106 may first connect to the safety controller 402 so that the safety controller 402 may govern the operation of the AMR 106 while the AMR 106 is within the workcell 104. In some embodiments, the AMR 106 may scan the barcode 406 (e.g., by using the barcode scanner of the AMR 106). The barcode 406 may be any suitable barcode. For example, the barcode 406 may be a linear barcode, a two-dimensional barcode, or an AprilTag. The barcode 406 may be positioned near the strip 404 so that the AMR 106 may scan the barcode 406 before entering the workcell 104. The barcode 406 may include information that allows the AMR 106 to connect to the safety controller 402. For example, the barcode 406 may identify the safety controller 402 or a network on which the safety controller 402 is connected. The AMR 106 may determine the connection information by scanning the barcode 406. After determining the connection information in the barcode 406, the AMR 106 may use that connection information to connect to the safety controller 402 or to a network connected to the safety controller 402. After the connection is formed, the safety controller 402 may communicate messages to the AMR 106. For example, the safety controller 402 may communicate the safety protocol governing the workcell 104 to the AMR 106. As another example, the safety controller 402 may communicate safety messages to the AMR 106 that indicate to the AMR 106 that the AMR 106 may continue operation in the workcell 104. After the AMR 106 has connected to the safety controller 402, the AMR 106 may enter the workcell 104.

In certain embodiments, the barcode 406 and the strip 404 may be integrated. For example, the barcode 406 may be printed onto the strip 404. When the AMR is positioned near the strip 404, the AMR may scan the strip 404 to detect and read the barcode 406.

In some embodiments, an indicator may be provided to the AMR 106, to let the AMR 106 know that the AMR 106 has connected to the proper safety controller 402 that governs the workcell 104. For example, if there are multiple workcells 104 in the system 100, each governed by a different safety controller 402, then an indication may be provided to the AMR 106 to let the AMR 106 know whether the AMR 106 has connected to the correct safety controller 402. In some embodiments, an optical emitter (e.g., lights) may provide such an indication. The lights may be positioned near or around the barcode 406. After the AMR 106 has connected to the safety controller 402, the safety controller 402 may illuminate the lights so that the lights emit an optical signal towards the AMR 106. When the AMR 106 detects that the lights have illuminated (e.g., using an optical sensor of the AMR 106), the AMR 106 may determine that the AMR 106 has connected to the correct safety controller 402. If the lights do not illuminate, the AMR 106 may determine that the AMR 106 has connected to the wrong safety controller 402 or the wrong network. For example, the barcode 406 may not have been installed properly or the AMR 106 may have mis-scanned the barcode 406. As a result, the AMR 106 may have connected to the wrong network or to the wrong safety controller 402. The AMR 106 may attempt to rescan the barcode 406 and connect to the appropriate safety controller 402. After the AMR 106 has connected to the proper safety controller 402 that governs the workcell 104, the safety controller 402 may illuminate the lights. When the AMR 106 detects that the lights have illuminated, the AMR 106 may be assured that the AMR 106 has connected to the correct safety controller 402.

In certain embodiments, the AMR 106 may use information in the barcode 406 to verify the connection with the safety controller 402. For example, the barcode 406 may include a decryption key that may be used to decrypt messages from the safety controller 402. The AMR 106 may determine the decryption key by scanning the barcode 406. After the AMR 106 has connected to the safety controller 402, the safety controller 402 may communicate messages to the AMR 106. The AMR 106 may use the decryption key to decrypt the messages from the AMR 106. If the messages are decrypted successfully, then the AMR 106 may determine that the AMR 106 has connected to the correct safety controller 402. If AMR 106 is unable to decrypt the messages using the decryption key, then the AMR 106 may determine that the AMR 106 has connected to the wrong safety controller (which may use a different decryption key).

Figure 5:
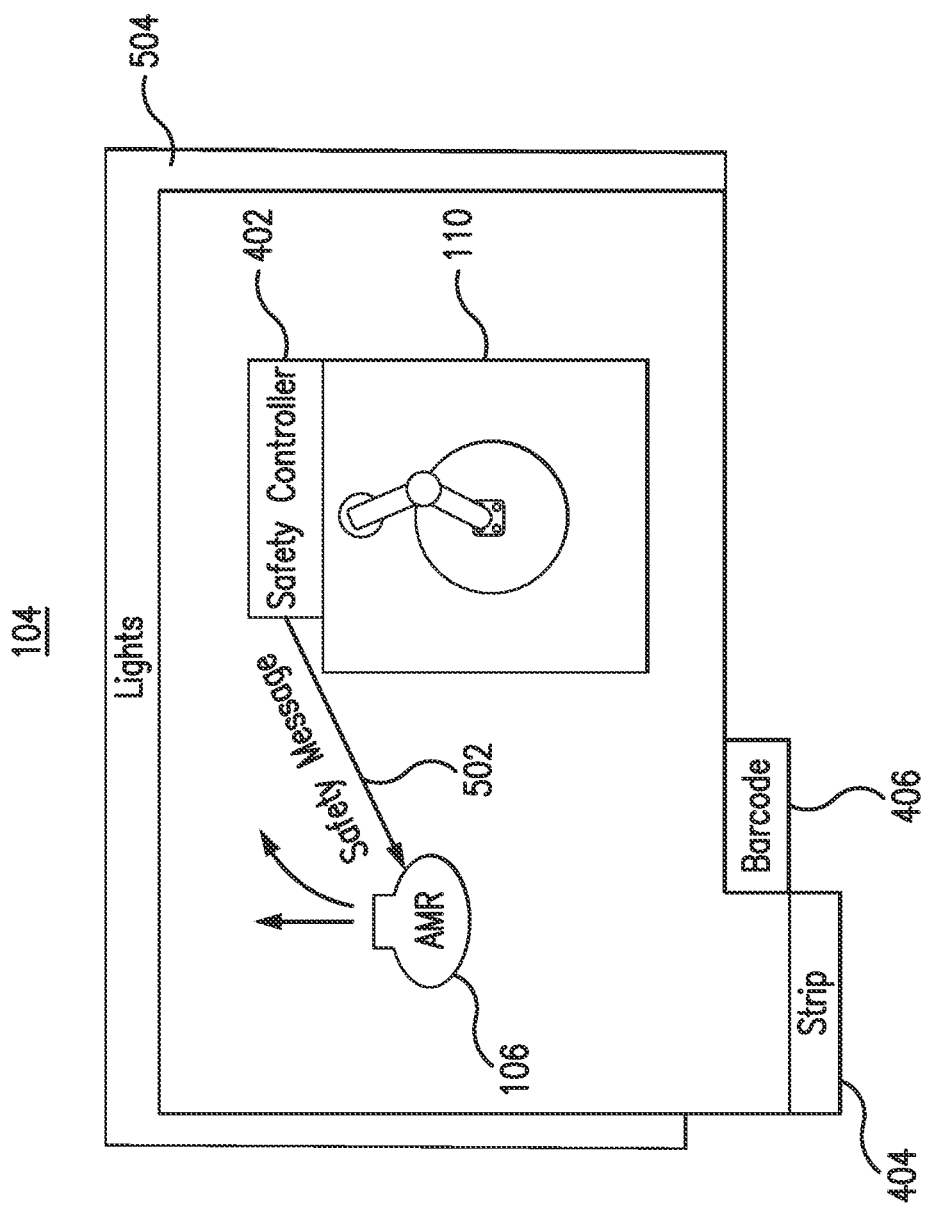
FIG. 5 illustrates an example workcell in the system of FIG. 1.

FIG. 5 illustrates an example workcell 104 in the system 100 of FIG. 1. As seen in FIG. 5, the AMR 106 has entered the workcell 104 and is operating within the workcell 104. As the AMR 106 operates within the workcell 104, the safety controller 402 may communicate safety messages 502 to the AMR 106. The safety controller 402 may regularly and repeatedly communicate the safety messages 502. The frequency at which the safety controller 402 communicates safety messages 502 to the AMR 106 may be adjusted, depending on the needs of the AMR 106 and the workcell 104. Importantly, the AMR 106 knows that the AMR 106 may continue operation within the workcell 104 as long as the AMR 106 receives safety messages 502 from the safety controller 402 at the predetermined frequency. When the safety controller 402 determines that it is no longer safe for the AMR 106 to operate within the workcell 104, the safety controller 402 may cease communicating the safety message 502 to the AMR 106. When the AMR 106 determines that the safety messages 502 from the safety controller 402 have ceased, the AMR 106 may cease operation or stop, so that the AMR 106 does not contact or hit an object or person within the workcell 104.

The safety messages 502 may be sent as part of a two-way communication between the AMR 106 and the safety controller 402. For example, the AMR 106 may communicate a request to the safety controller 402. In response to that request, the safety controller 402 may communicate the safety message 502 to the AMR 106. This two-way communication may continue as the AMR 106 operates in the workcell 104.

As an example operation, the workcell 104 may include sensors that can detect when a person has entered the workcell 104. When a person enters the workcell 104, the sensors may detect that person and communicate to the safety controller 402 that a person has entered the area. In response, the safety controller 402 may stop communicating safety messages 502 to the AMR 106. When the AMR 106 determines that the safety messages 502 have stopped, the AMR 106 may cease operations and stop, so that the AMR 106 does not hit or contact the person within the workcell 104.

As discussed previously, the AMR 106 may operate within the workcell 104 according to a safety protocol that governs the workcell 104 rather than according to the programmed safety protocol of the AMR 106. The AMR 106 may receive the safety protocol that governs the workcell 104 from the safety controller 402. The AMR 106 may operate according to the limits and bounds of the safety protocol from the safety controller 402 while the AMR 106 is within the workcell 104.

In some embodiments, optical emitters (e.g., lights 504) are positioned around the workcell 104. The lights 504 may indicate to the AMR 106 when it is safe to operate within the workcell 104. For example, the lights 504 may illuminate and emit optical signals when it is safe for the AMR 106 to operate within the workcell 104. The lights 504 may turn off when it is no longer safe for the AMR 106 to operate within the workcell 104. An optical sensor of the AMR 106 may detect when the lights 504 are on or off. If the AMR 106 detects that the lights 504 are on, the AMR 106 may continue operating within the workcell 104. When the AMR 106 detects that the lights 504 have turned off, the AMR 106 may cease operation or stop. As an example, when the safety controller 402 detects that a person has entered the workcell 104, the safety controller 402 may turn off the lights 504 to indicate to the AMR 106 that it is no longer safe to operate within the workcell 104. When the AMR 106 detects that the lights 504 have turned off, the AMR 106 may cease operation or stop.

In some embodiments, mechanisms other than the optical emitters (e.g., lights 504) are used to indicate to the AMR 106 that it may continue operation in the workcell 104. For example, a boundary wire may be installed around the workcell 104. The wire may form a coil that generates a magnetic field when electric current is sent through the wire. If the AMR 106 detects the presence of the magnetic field, the AMR 106 may continue operating. If the AMR 106 does not detect the magnetic field or if the AMR 106 detects a change in the magnetic field (e.g., a change in polarity), the AMR 106 may stop.

In some embodiments, if the AMR 106 is leaving the workcell 104 without transitioning back to the programmed safety protocol of the AMR 106, then the AMR 106 may immobilize or stop. The AMR 106 may accidentally or unintentionally move to the exit of the workcell 104 before the AMR 106 has completed its operation in the workcell 104. The AMR 106 may unknowingly or unintentionally move to the exit of the workcell 104, before the AMR 106 has completed its operation in the workcell 104. As a result, the AMR 106 may not begin the transition back to the programmed safety protocol of the AMR 106. Instead, the AMR 106 may continue using the safety protocol of the workcell 104. Thus, if the AMR 106 is not immobilized, the AMR 106 may leave the workcell 104 but continue operating using the safety protocol of the workcell 104. To prevent this occurrence, the AMR 106 may determine when the AMR 106 has moved near the exit of the workcell 104. For example, the AMR 106 may include a color sensor that detects the colored strip 404 at the exit of the workcell 104. When the AMR 106 detects the colored strip 404, the AMR 106 may determine that the AMR 106 is near the exit of the workcell 104. If the AMR 106 has not completed its operation in the workcell 104, the AMR 106 may immobilize or stop moving towards the exit of the workcell 104. As another example, the AMR 106 may monitor the wheel odometry data of the AMR 106 to track the position of the AMR 106 in the workcell 104. When the wheel odometry data indicates that the AMR 106 is near the exit of the workcell 104, the AMR 106 may immobilize.

In certain implementations, the workcell 104 is arranged so that the AMR 106 stops receiving safety messages 502 from the safety controller 402 when the AMR 106 leaves the workcell 104. For example, there may be message blockers or the range of the connection range of the safety controller 402 may be limited to the physical boundary of the workcell 104. As a result, if the AMR 106 moves outside the boundary of the workcell 104, the AMR 106 stops receiving the safety messages 502 and immobilizes. In some embodiments, instead of immobilizing, the AMR 106 switches from the safety protocol of the workcell 104 back to the safety protocol of the AMR 106. As a result, the AMR 106 may continue operating outside the workcell 104.

Figure 6:
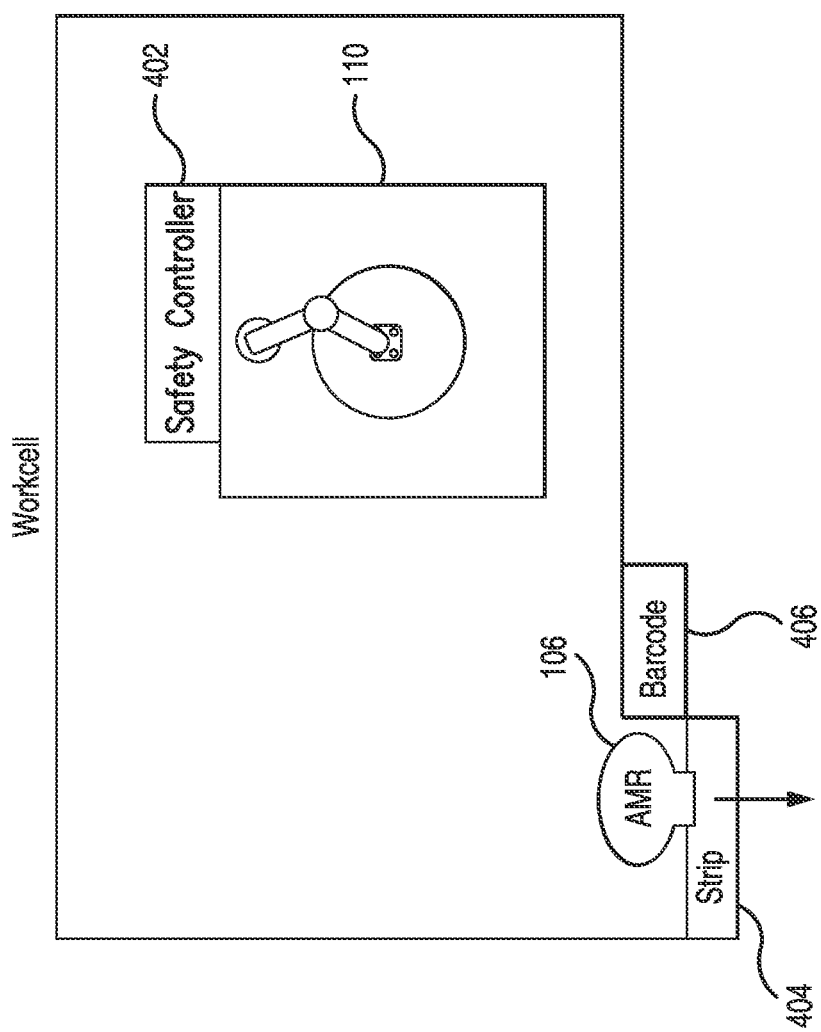
FIG. 6 illustrates an example workcell in the system of FIG. 1.

FIG. 6 illustrates an example workcell 104 in the system of FIG. 1. Generally, FIG. 6 illustrates the AMR 106 leaving the workcell 104. When the AMR 106 has completed its operation in the workcell 104, the AMR 106 may begin leaving the workcell 104. When the AMR 106 approaches the exit of the workcell 104, the color sensor of the AMR 106 may detect the colored strip 404 on the ground at the exit of the workcell 104. The AMR 106 may then disconnect from the safety controller 402 and switch its operation back to the programmed safety protocol of the AMR 106. After the AMR 106 has switched its operation to be governed by the programmed safety protocol of the AMR 106, the AMR 106 may leave the workcell 104. In this manner, the AMR 106 ensures that the AMR 106 operates according to the proper safety protocol of the location of the AMR 106.

Figure 7:
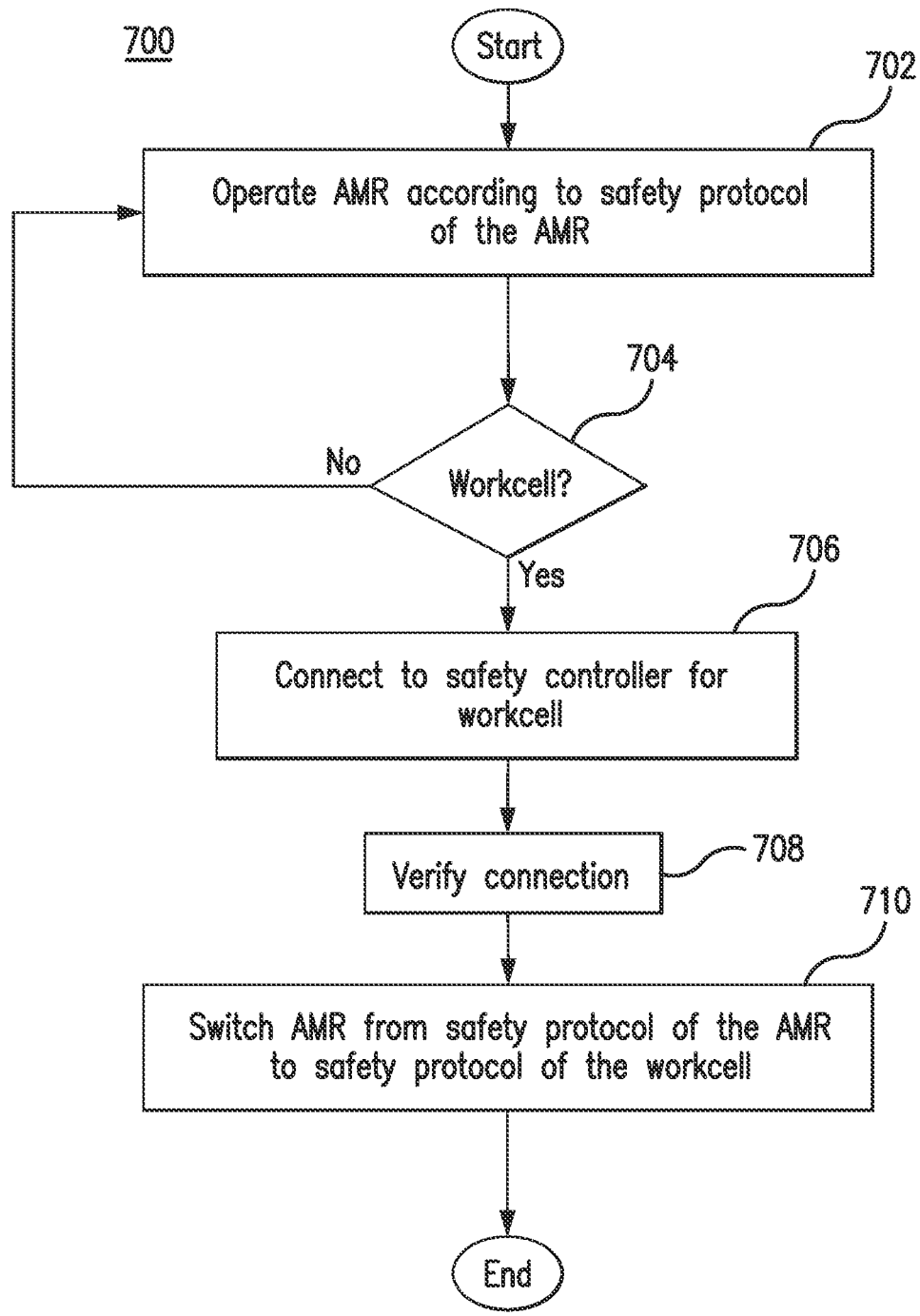
FIG. 7 is a flowchart of an example method performed in the system of FIG. 1.

FIG. 7 is a flowchart of an example method 700 performed in the system 100 of FIG. 1. In certain embodiments, the AMR 106 performs the method 700. By performing the method 700, the AMR 106 switches its operation to be governed by a safety protocol that governs a workcell 104 when the AMR 106 is operating within the workcell 104.

In block 702, the AMR 106 operates according to a programmed safety protocol of the AMR 106. The AMR 106 may be located in an area within the system 100, such as the container area 102. When the AMR 106 is in this area, the AMR 106 operates according to the programmed safety protocol of the AMR 106, which may be the default operation of the AMR 106. This safety protocol may allow the AMR 106 to operate safely while the AMR is in this area.

In block 704, the AMR 106 determines whether it is approaching a workcell 104. For example, the AMR 106 may include a color sensor that detects a colored strip 404 positioned on the ground at the entrance of the workcell 104. If the AMR 106 does not detect the colored strip 404, the AMR 106 may determine that it is not approaching the workcell 104 and continue operating under the programmed safety protocol of the AMR 106. If the AMR 106 determines that it is approaching the workcell 104, the AMR 106 may take steps to switch its operation to be governed by a safety protocol that governs the workcell 104.

In block 706, the AMR 106 connects to a safety controller 402 for the workcell 104. The safety controller 402 may govern the operation of robots within the workcell 104. The AMR 106 may scan a barcode 406 positioned near the entrance of the workcell 104 to determine connection information for the safety controller 402. The AMR 106 may include a barcode scanner that scans the barcode 406 to determine the connection information. After the AMR 106 determines the connection information, the AMR 106 uses that connection information to connect to the safety controller 402 or to a network on which the safety controller 402 is connected.

In block 708, the AMR 106 verifies the connection to the safety controller 402. For example, the AMR 106 may include optical sensors that detect whether optical emitters (e.g., lights) positioned near the barcode 406 illuminate. The safety controller 402 may illuminate the lights after the AMR 106 connects to the safety controller 402. When the AMR 106 detects that the lights have illuminated, the AMR 106 may verify that the AMR 106 has connected to the correct safety controller 402. If the lights do not illuminate, then the AMR 106 may determine that the AMR 106 has not connected to the correct safety controller 402. As another example, the barcode 406 may include a decryption key that the AMR 106 uses to decrypt messages from the safety controller 402. If the AMR 106 successfully decrypts messages from the safety controller 402 using the decryption key, then the AMR 106 may determine that the connection with the safety controller 402 is verified. If the AMR 106 is unable to decrypt messages from the safety controller 402 using the decryption key, then the AMR 106 may determine that the connection is not verified.

In block 710, the AMR 106 switches from the programmed safety protocol of the AMR 106 to the safety protocol of the workcell 104. In some embodiments, the safety controller 402 may communicate the safety protocol for the workcell 104 to the AMR 106 after the AMR 106 has connected to the safety controller 402. When the AMR 106 determines that the AMR 106 has connected to the correct safety controller 402, the AMR 106 may switch to the safety protocol communicated by the safety controller 402. The AMR 106 may then enter the workcell 104.

Figure 8:
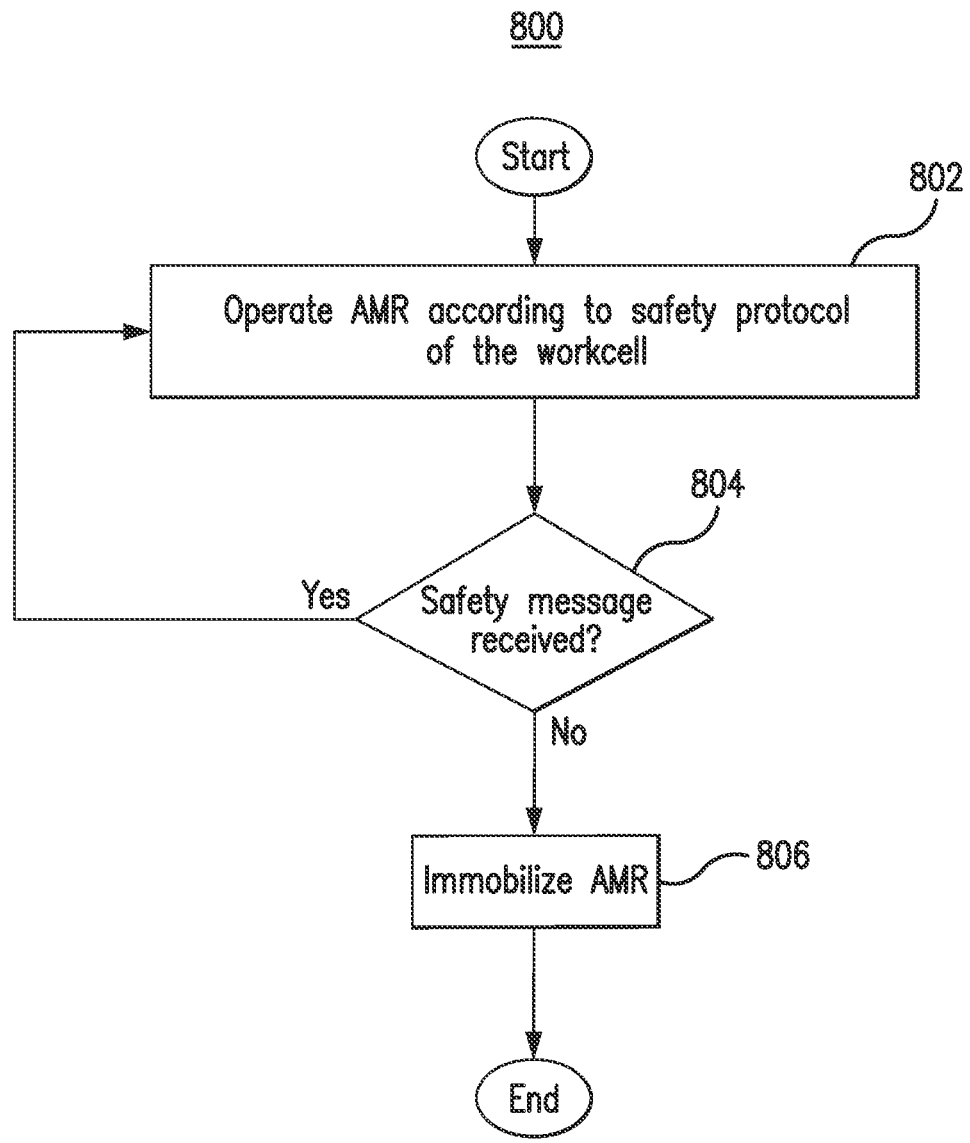
FIG. 8 is a flowchart of an example method performed in the system of FIG. 1.

FIG. 8 is a flowchart of an example method 800 performed in the system 100 of FIG. 1. In certain embodiments, the AMR 106 performs the method 800. By performing the method 800, the AMR 106 operates safely within the workcell 104.

In block 802, the AMR 106 operates according to the safety protocol of the workcell 104. This safety protocol may restrict any facet of the operation of the AMR 106 within the workcell 104. For example, the safety protocol may limit how close the AMR 106 may be to other components or objects within the workcell 104. As another example, the safety protocol may limit how quickly the AMR 106 may move within the workcell 104.

In block 804, the AMR 106 determines whether the safety message 502 has been received from the safety controller 402. The safety controller 402 may communicate the safety message 502 to the AMR 106 at a predefined frequency. If the AMR 106 determines that the safety message 502 is being received according to the predetermined frequency, the AMR 106 may continue operating within the workcell 104 according to the safety protocol of the workcell 104. If the AMR 106 determines that the safety message 502 has stopped or that the safety message 502 is not being received according to the predetermined frequency, the AMR 106 may cease operation in block 806. For example, the AMR 106 may immobilize in order to not hit or contact objects within the workcell 104. The AMR 106 may continue or resume operation when the AMR 106 receives the safety message 502 from the safety controller 402 again.

Figure 9:
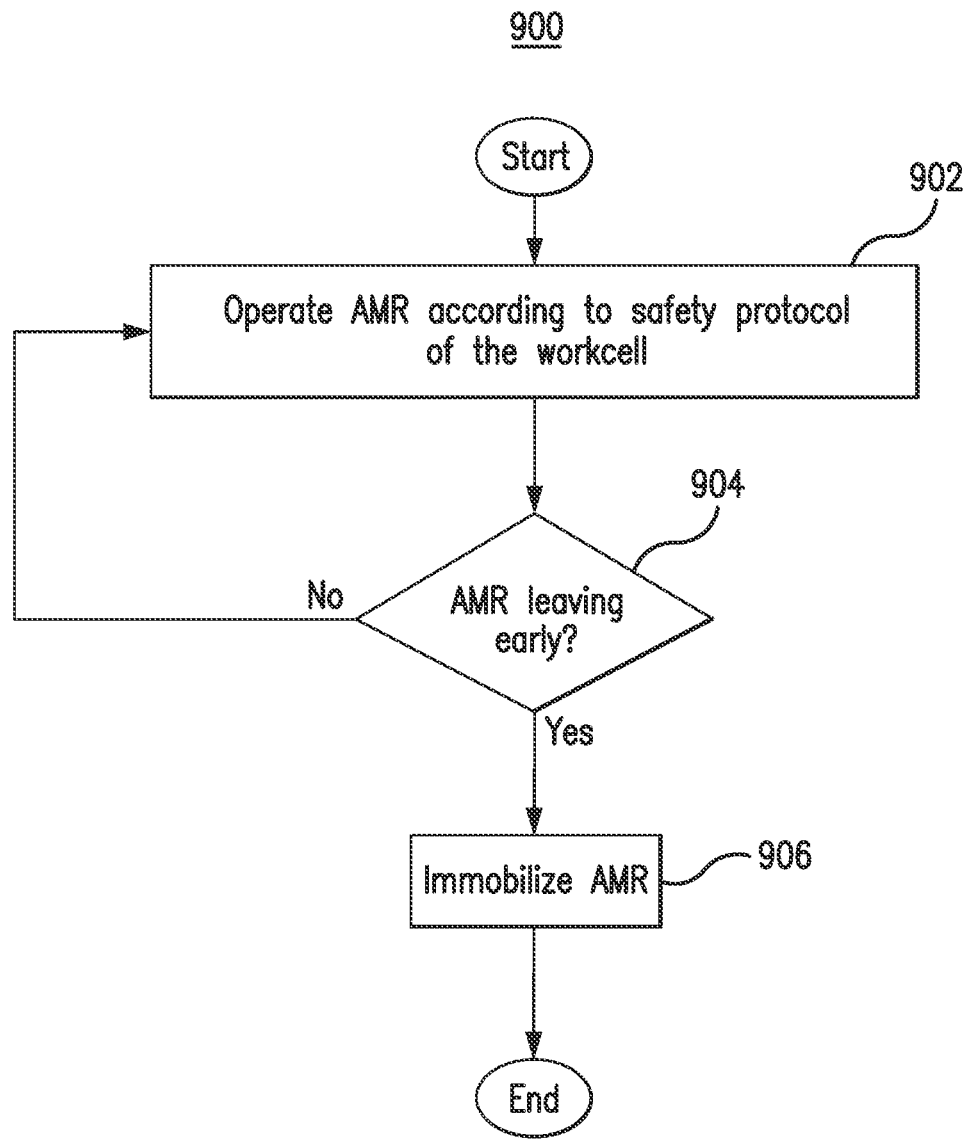
FIG. 9 is a flowchart of an example method performed in the system of FIG. 1.

FIG. 9 is a flowchart of an example method 900 performed in the system 100 of FIG. 1. In certain embodiments, the AMR 106 performs the method 900. By performing the method 900, the AMR 106 does not travel outside the workcell 104 before the AMR 106 has completed operating within the workcell 104.

In block 902, the AMR 106 is operated according to the safety protocol of the workcell 104 while the AMR 106 is within the workcell 104. In block 904, the AMR 106 determines whether the AMR 106 is leaving the workcell 104 early. For example, the AMR 106 may detect the colored strip 404 positioned at the exit of the workcell 104. In response, the AMR 106 may determine that the AMR 106 is moving towards the exit of the workcell 104 before the AMR 106 has completed operating within the workcell 104. As another example, the AMR 106 may analyze its wheel odometry data to track the position of the AMR 106 within the workcell 104. The AMR 106 may determine from the wheel odometry data that the AMR 106 is moving towards the exit of the workcell 104 before the AMR 106 has completed operating within the workcell 104. If the AMR 106 does not determine that the AMR 106 is moving towards the exit of the workcell 104, then the AMR 106 may continue operating in the workcell 104 according to the safety protocol of the workcell 104.

If the AMR 106 determines that the AMR 106 is leaving the workcell 104 early, then the AMR 106 may immobilize or cease operating in block 906. The AMR 106 may then turn around or reset its operation within the workcell 104. In this manner, the AMR 106 is prevented from leaving the workcell 104 early.

Figure 10:
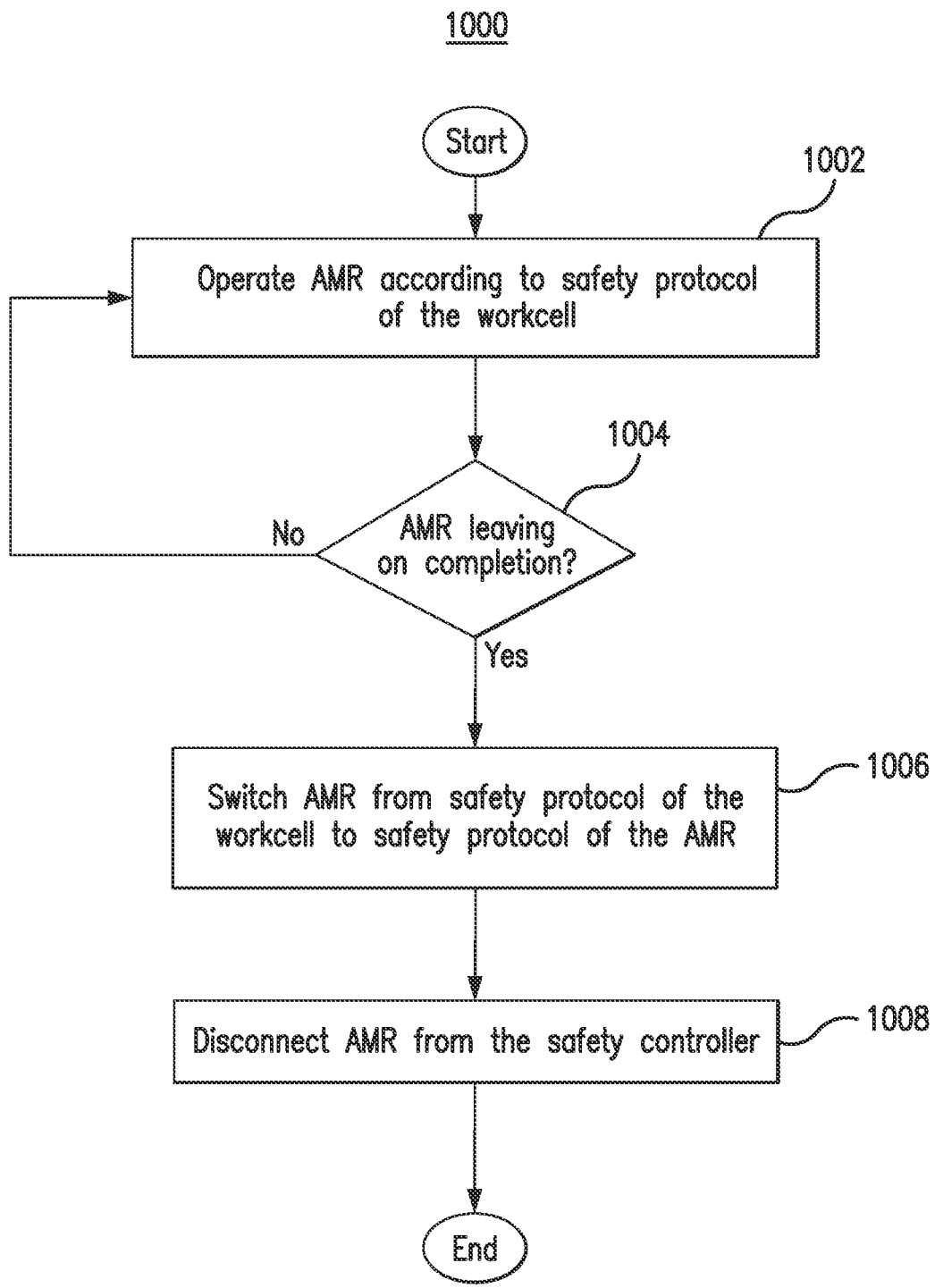
FIG. 10 is a flowchart of an example method performed in the system of FIG. 1.

FIG. 10 is a flowchart of an example method 1000 performed in the system 100 of FIG. 1. In particular embodiments, the AMR 106 performs the method 1000. By performing the method 1000, the AMR 106 transitions its operation to be governed by the programmed safety protocol of the AMR 106 when the AMR 106 is leaving the workcell 104.

In block 1002, the AMR 106 operates according to the safety protocol of the workcell 104 while the AMR 106 is within the workcell 104. In block 1004, the AMR 106 determines whether the AMR 106 has completed operation within the workcell 104 and is leaving the workcell 104. If the AMR 106 is not leaving the workcell 104, then the AMR 106 may continue operating according to the safety protocol of the workcell 104. If the AMR 106 has completed its operation in the workcell 104, the AMR 106 may begin moving towards the exit of the workcell 104. The AMR 106 may determine that the AMR 106 has reached the exit of the workcell 104 when a color detector of the AMR 106 detects the colored strip 404 at the entrance/exit of the workcell 104. The AMR 106 may stop when the AMR 106 reaches the entrance/exit of the workcell 104.

If the AMR 106 is leaving the workcell 104, then the AMR 106 may switch the AMR 106 from the safety protocol of the workcell 104 to the programmed safety protocol of the AMR 106 in block 1006. In block 1008, the AMR 106 then disconnects from the safety controller 402. After disconnecting from the safety controller 402, the AMR 106 may exit the workcell 104. In this manner, the AMR 106 transitions back to its programmed safety protocol when operating outside the workcell 104.

In summary, the AMR 106 may operate safely in smaller or more confined spaces (e.g., the workcell 104), which may be governed by different safety protocols than the programmed safety protocol of the AMR 106. Generally, the AMR 106 may operate according to its programmed safety protocol, but when the AMR 106 detects that the AMR 106 is about to enter one of these spaces, the AMR 106 may connect to a safety controller 402 for that space. The AMR 106 may then switch from operating under its programmed safety protocol to operating under the safety protocol provided by the safety controller 402. In this manner, the AMR 106 operates under the proper safety protocol while the AMR 106 is located in the smaller or more confined space. When the AMR 106 has completed its operation in the space and is ready to leave the space, the AMR 106 disconnects from the safety controller 402 and switches back to operating according to the programmed safety protocol of the AMR 106. As a result, the AMR 106 operates safely even when the AMR 106 is located in the smaller or more confined space, in certain embodiments The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
    operating an autonomous mobile robot (AMR) according to a first safety protocol of the AMR;
    in response to a color sensor of the AMR scanning a first colored strip assigned to an entry of a physical location, determining that the AMR has entered the physical location;
    in response to determining that the AMR has entered the physical location, switching the AMR to operate under a second safety protocol of the physical location rather than the first safety protocol while the AMR is located in the physical location, wherein the first safety protocol is different from the second safety protocol;
    in response to detecting, by the AMR, that an optical emitter in the physical location has turned off an optical signal, immobilizing the AMR;
    in response to receiving instructions, from a safety controller of the physical location, to move to an exit of the physical location, determining that the AMR has completed operating in the physical location;
    in response to detecting, by the color sensor, that the AMR has moved proximate a second colored strip after the AMR has completed operating in the physical location, switching the AMR to operate under the first safety protocol, wherein the second colored strip is assigned to the exit of the physical location, and wherein the second color strip is a different color than the first color strip; and
    operating the AMR to exit the physical location.

2. The method of claim 1, wherein switching the AMR to operate under the second safety protocol comprises:

scanning, by the AMR, a barcode to determine connection information with the safety controller of the physical location; and connecting the AMR with the safety controller using the connection information.

3. The method of claim 1, further comprising:

in response to receiving instructions from the safety controller, determining operation progress of the AMR in the physical location; and in response to detecting that the AMR is leaving the physical location before the AMR has completed operating in the physical location, stopping the AMR.

4. The method of claim 1, wherein switching the AMR to operating under the first safety protocol is further based on wheel odometry data from the AMR.

5. A method comprising:

operating an AMR in a first physical location according to a first safety protocol of the AMR;

based on a location of the AMR relative to a second physical location different from the first physical location and with a second safety protocol different from the first safety protocol, switching the AMR to operate under the second safety protocol rather than the first safety protocol while the AMR is located in the second physical location;

in response to detecting, by the AMR, that an optical emitter in the second physical location has turned off an optical signal, immobilizing the AMR;

in response to receiving instructions from a safety controller of the second physical location, determining operation progress of the AMR in the second physical location;

in response to receiving instructions from the safety controller to move to an exit of the second physical location, determining that the AMR has completed operating in the second physical location; and in response to detecting that the AMR is exiting the second physical location after the AMR has completed operating in the second physical location, switching the AMR to operate under the first safety protocol.

6. The method of claim 5, further comprising detecting entry of the AMR into the second physical location by scanning, using a color sensor of the AMR, a first colored strip assigned to an entry of the second physical location.

7. The method of claim 5, wherein switching the AMR to operate under the second safety protocol comprises:

scanning, by the AMR, a barcode to determine connection information for the safety controller of the second physical location; and connecting the AMR with the safety controller using the connection information.

8. The method of claim 7, wherein switching the AMR to operate under the second safety protocol further comprises detecting, by the AMR, an optical signal emitted proximate the barcode indicating confirmation of the connection between the AMR and the safety controller.

9. The method of claim 7, further comprising immobilizing the AMR in response to determining, by the AMR, that the safety controller has ceased communicating a safety message to the AMR.

10. The method of claim 5, further comprising:

in response to receiving instructions from the safety controller, determining operation progress of the AMR in the second physical location; and in response to detecting that the AMR is leaving the second physical location before the AMR has completed operating in the second physical location, immobilizing the AMR.

11. The method of claim 10, wherein detecting that the AMR is leaving the second physical location comprises detecting, using a color sensor of the AMR, that the AMR has moved proximate a second colored strip, wherein the second colored strip is assigned to the exit of the second physical location, and wherein the second color strip is a different color than a first color strip assigned to an entry of the second physical location.

12. The method of claim 10, wherein detecting that the AMR is leaving the second physical location uses wheel odometry data from the AMR.

13. The method of claim 5, wherein detecting that the AMR has entered the second physical location comprises detecting one or more of a radio frequency identifier tag of the second physical location or a floor bump of the second physical location.

14. An autonomous mobile robot (AMR) comprising:

a memory; and a processor communicatively coupled to the memory, the processor configured to:

operate the AMR in a first physical location according to a first safety protocol of the AMR;

based on a location of the AMR relative to a second physical location different from the first physical location and with a second safety protocol different from the first safety protocol, switch the AMR to operate under the second safety protocol rather than the first safety protocol while the AMR is located in the second physical location;

in response to detecting, by the AMR, that an optical emitter in the second physical location has turned off an optical signal, immobilize the AMR;

in response to receiving instructions from a safety controller of the second physical location, determine operation progress of the AMR in the second physical location;

in response to receiving instructions from the safety controller to move to an exit of the second physical location, determine that the AMR has completed operating in the second physical location; and in response to detecting that the AMR is exiting the second physical location after the AMR has completed operating in the second physical location, switch the AMR to operate under the first safety protocol.

15. The AMR of claim 14, further comprising a color sensor, wherein the processor is further configured to detect entry of the AMR into the second physical location by scanning, using the color sensor, a first colored strip assigned to an entry of the second physical location.

16. The AMR of claim 14, wherein switching the AMR to operate under the second safety protocol comprises:

scanning a barcode to determine connection information for the safety controller of the second physical location; and connecting the AMR with the safety controller using the connection information.

17. The AMR of claim 16, wherein switching the AMR to operate under the second safety protocol further comprises detecting an optical signal emitted proximate the barcode indicating confirmation of the connection between the AMR and the safety controller.

18. The AMR of claim 16, wherein the processor is further configured to immobilize the AMR in response to determining that the safety controller has ceased communicating a safety message to the AMR.

* * * * *